Oct. 20, 1964    A. L. DE GRAFFENRIED    3,153,739
ELECTROLUMINESCENT INDICATING DEVICE
Filed April 30, 1962    2 Sheets-Sheet 1

INVENTOR
Albert L. deGraffenried
BY Leonard H. King
ATTORNEY

Oct. 20, 1964     A. L. DE GRAFFENRIED     3,153,739
ELECTROLUMINESCENT INDICATING DEVICE
Filed April 30, 1962     2 Sheets-Sheet 2

INVENTOR
Albert L. deGraffenried
BY Leonard H. King
ATTORNEY

United States Patent Office 3,153,739
Patented Oct. 20, 1964

3,153,739
ELECTROLUMINESCENT INDICATING DEVICE
Albert L. de Graffenried, Roslyn Harbor, N.Y., assignor to Avien, Inc., Woodside, N.Y.
Filed Apr. 30, 1962, Ser. No. 191,148
7 Claims. (Cl. 313—108)

The present application is a continuation in part of application No. 24,030, filed April 22, 1960, now Patent 3,038,097, and relates to improved visual display means employing a moving vertical column of electroluminescent light as the visual indication.

As set forth in the parent application, phosphor particles are subjected to a fluctuating electric field generated by a transparent conducting layer to one side of the phosphor and a conducting fluid electrode of mercury disposed on the opposite side of the phosphor. In the present invention, this principle is utilized to provide novel and highly useful visual display means. Color and contrast pattern is provided which is an accurate indication of environmental data being measured. The display configuration is such as to provide minimal possibility of observation error.

In the said parent application, a luminescent bar graph is disclosed. There is the likelihood of human error where many indicators must be read and recorded in rapid succession. Hence, it is proposed in the present invention to provide upper and lower limit warning means for luminous bar graphs, and also to provide inherently attention-attracting and interesting patterns to maintain the alertness of personnel detailed to monitor the device.

It s therefore a primary object of the present invention to provide an improved electroluminescent display device characterized by novel color and pattern configurations, whereby information is conveyed to an observer in luminous bar graph form.

It is a further object of the present invention to provide an improved readout instrument for an actuating signal, said instrument having a high degree of accuracy and reliability.

Yet a further object of the present invention is to provide a sensitive electroluminescent device, having clear "either or" display, wherein ambiguity is eliminated.

Still a further object of the present invention is to provide a visual display having an integrally incorporated alarm system.

Still a further object is to provide novel masking means in a device of this type, whereby only a movable illuminated spot is seen by the observer.

Yet a further object of the present invention is the provision for novel display means whereby a blended color is visible to an observer in situations where the "moving spot" covers more than one color.

Still another object of the present invention is provision for an array or matrix of individual display units, whereby adjacent units present isochromes adapted to represent isometric conditions in the system being monitored.

It is still a further object of the present invention to provide simplified means for overall monitoring of a display whereby equivalent combinations of different colors are adapted to energize an alarm signal.

These and other objects and advantages of the present invention will be pointed out with further particularity or will be apparent from the following description in conjunction with the drawings appended thereto, wherein.

Figure 1:
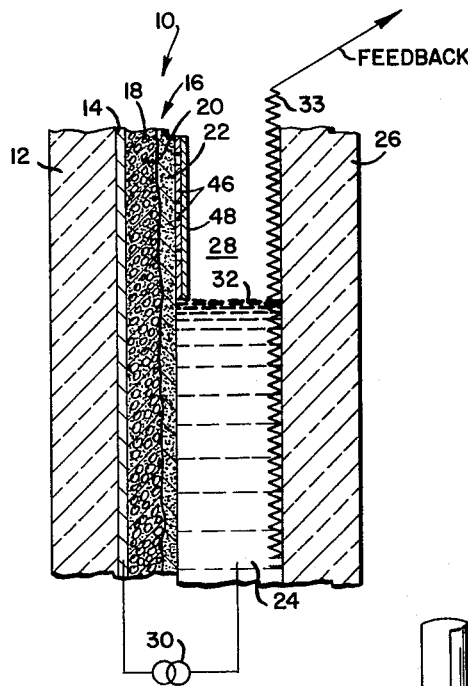
FIG. 1 is a diagrammatic view in cross-section of a device of the present invention.

Referring more particularly to the drawings, FIG. 1 is a side view in cross-section of the present invention, characterized generally by the numeral 10, comprising a transparent plate 12 upon which is deposited a transparent conducting layer 14. Layer 14 is a vacuum deposited transparent layer of metal or metallic oxide and constitutes the front fixed electrode for the device. Immediately behind this is an electroluminescent mosaic 16 formed of phosphor particles 18 in solid suspension in an insulator medium such as low temperature glass or ceramic frit 20. Protective layer 22 is a thin layer of low temperature ceramic interposed between mosaic 16 and conducting fluid electrode 24. The liquid mercury metal 24 constitutes a movable electrode. Backing plate 26, formed of an electrical non-conductor, such as "Lucite" or "Plexiglas," or the like, in conjunction with layer 22, defines chamber 28 wherein mercury 24 is contained.

Alternating voltage 30 is applied between front and rear electrodes 14 and 24, respectively, whereby phosphor particles 18 are subjected to a fluctuating electric field, hence emit electroluminescent light. Only those particles below the level 32 of the top of the mercury column will emit light. Particles above this level experience no fluctuating electric field. It will therefore be appreciated that as the mercury column rises and falls the observer in front of the indicator will see a moving vertical bar of electroluminescent light having the form of a luminous bar graph.

As set forth in the aforementioned parent application, the level 32 of the mercury may be made responsive to an input signal by a closed servo loop arrangement, whereby the height of the mercury column is an analog of the magnitude of the input signal. That is, as the input signal rises or falls, the height of the mercury will have a corresponding rise or fall. The moving mercury column shorts out sections of feedback resistance wire 33, whereby a correctional signal related to the height of the column is fed back to the system. Conventional diaphragm means (not shown) may be employed to vary the height of the mercury column, the diaphragm being displaced by the magnitude of the input signal.

Figure 2:
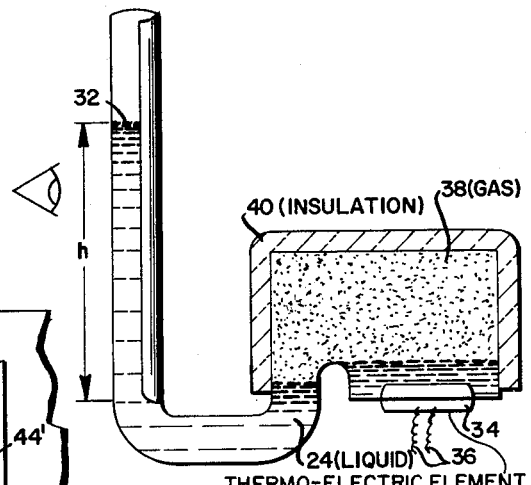
FIG. 2 is an alternate embodiment of the actuating means for varying the level of liquid in a device of the present invention.

As shown in FIG. 2, an alternative means for actuating the mercury column comprises thermo-electric element 34 controlled by a reversible D.C. current 36, whereby one polarity of the D.C. current generates a heating effect in element 34, and the opposite polarity generates a cooling effect, by means well known in the art. Freon gas 38, contained in insulation chamber 40, will be contracted to the liquid phase or expanded to the gas phase depending on the polarity of D.C. current 36. Freon 38 is in fluid communication with mercury column 24, whereby the level 32 of the mercury column is a function of this D.C. current. It will be appreciated that the D.C. current defines the actuating signal and a device characterized by the absence of moving parts is therefore then provided.

Figure 3A:
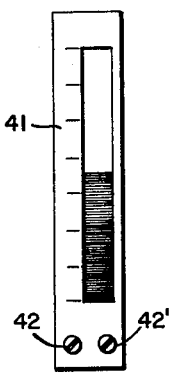
FIGS. 3A and 3B illustrate a typical display wherein individual units of the present invention are arranged in an array.

The device above illustrated will provide a visual output which is an integrated representation of the input signal; that is, it will be continuously variable over the range of interest. Such a device, for example, is illustrated in FIG. 3A, wherein the phosphor emits a uniform glow of a standard color, such as blue, and varies in height along the indicated numerical scale. It will be appreciated that this thermometer-type of indicator will not alert the observer to a slow or minor change especially where one is called upon to supervise a large number of such devices. The present invention therefore provides contrast and configuration means whereby a number of individual modules 41, such as shown in FIG. 3a, may be combined in an array 41a–f, FIG. 3B. In the illustration, each unit is shown monitoring one variable in a transmitter. Each module is provided with its own feedback loop whereby the height of the column is an analog of the magnitude of the input signal. It will be noted from the display that the indicators 41a, 41b and 41c show a safe condition, with the liquid within limits 44–44'. Indicator 41f shows a low reading. Indicators 41d and 41e are discussed hereinbelow.

At the base of each indicator are positioned two adjusting screws of trimmer potentiometers 42–42'. Potentiometer 42 sets the sensitivity of the input signal in terms of inches/volts or inches/milliamps, while potentiometer 42' adjusts the zero setting. When both of these adjustments are properly made, horizontal lines 44–44' will represent in each case the upper and lower limit allowed for the particular variable. Horizontal lines 44–44' are colored photoconductive strips. The passing of any one of the indicators outside its limits, above or below, will cause a change in the total light flux reaching either strip. This flux change unbalances a threshold circuit, such as an oscillating bridge detector (see for example Transitron Electronic Corp. application notes 3–56), and which is adapted to sound an audible alarm thereby summoning the operator's attention.

There is thus provided in the present invention novel means utilizing the light emissive properties of the phosphor particles to actuate the alarm system.

Figure 3B:
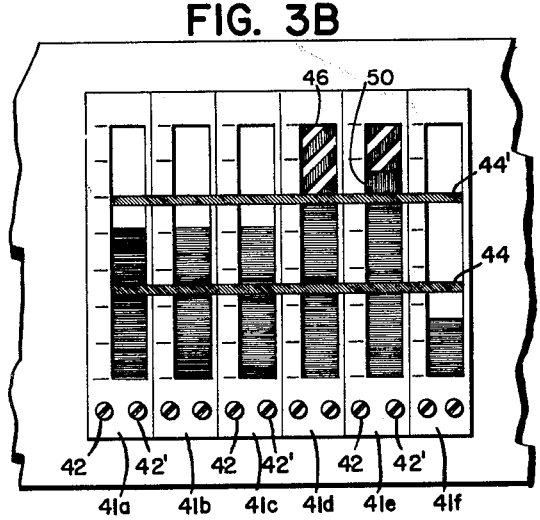

As shown in FIG. 3B, module 41d indicates a reading at the upper safe limit by means of "red flag" 46, formed by diagonal red stripes. This is produced by appropriate red-emissive phosphors deposited in the mosaic 16 in the indicated areas (see FIG. 1). Diagonal stripes are produced by disposing diagonal metallic stripes 46 on the rear surface of protective layer 22 behind the mosaic. The individual stripes are connected by a feeder strip 48 which runs vertically down to the desired level. As the mercury rises, it eventually reaches this level corresponding to the upper limit 44'. Here it contacts feeder strip 48 which immediately energizes the entire diagonal grid, hence illuminates the corresponding portions of the mosaic. If the monitored variable rises beyond its upper limit, herein shown by module 41e, the mercury energizes the red-tinted phosphor at 50 and thereby shows the operator by how much he has exceeded the upper limit. Thus the operator is given an unmistakable indication as to whether he is operating within the prescribed limit.

Figure 4:
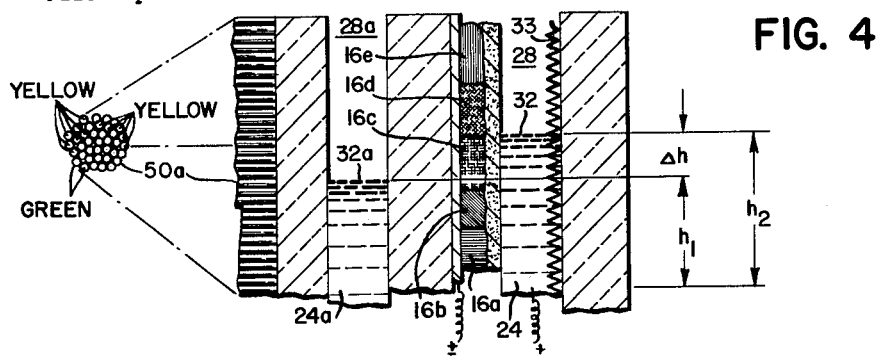
FIG. 4 is a side elevation showing in cross-section an arrangement for providing a moving spot display.

The use of phosphors of different colors is a noteworthy feature of the present invention. As shown in FIG. 4, these may be arranged in vertical areas 16a–e, each discrete vertical area of mosaic 16 having its own distinctive color.

The present invention provides means for generating a moving spot type of presentation. This is achieved by means of two columns of mercury 24 and 24a, operated in tandem, with column 24a disposed in front of the mosaic and maintained at a fixed level 32a at a height $\Delta h$ below level 32. Since both columns of mercury are varied simultaneously, the only portion of mosaic 16 that will be illuminated to the view of an observer is that portion not masked by column 24a, namely, the area $\Delta h$. Column 24a, contained in chamber 28a, may be conveniently coupled to the drive means actuating column 24, hence variable in tandem with column 24.

As the luminous spot moves across the boundary of adjacent color regions, the viewer will observe the two colors as two distinct layers. If this is objectionable, then an optical fiber bundle 50a may be positioned in front of the viewing surface. These fibers are arranged in a non-symmetrical or incoherent manner, as shown in FIG. 4, whereby the color seen at the viewing end is of uniform hue created by the blending of two colors as indicated. For example, if a large amount of yellow and a small amount of green is disclosed by the area $\Delta h$, then the viewer sees a yellow color with a green tint. This presentation is desirable, for example, where the movable column of mercury represents temperature and the colors are stacked from a "cold" blue to a "hot" red. In this case, a gradual merging and changing colors will take place.

For certain applications, a positive shift from a given color to the next one is desired. For example, consider a human body temperature measuring device where for convenience the following display is desired.

Figure 5:
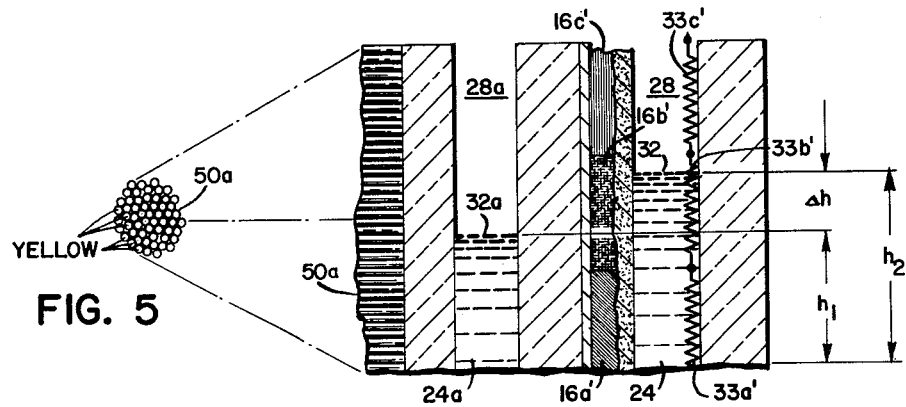
FIG. 5 is a side elevation showing in cross-section an arrangement for providing a digital color display.

Temperatures:
    98.8° F. and below—green
    98.8° F. to 99.6° F.—yellow
    Above 99.6° F.—red The digitalized display required is shown in FIG. 5. For this embodiment, the electroluminescent display employs but three phosphors, namely, green, yellow and red, as indicated by the reference letters 16a', 16b' and 16c'. A modified feed-back resistance wire 33a is chosen whereby the wire is segmented at 33a, 33b', and 33c'. The segments are joined by low resistance wire. The length and position of the jumper wire are so chosen that the $\Delta h$ is either entirely in the green or in the yellow but never in-between.

When the body temperature is in the normal range $h_2$ is between "A" and "B" and only green is visible to the observer's eye. As the input voltage rises, the rear mercury column rises until its reaches "B." If the input voltage continues to rise, the column will jump to level "C" in its attempt to increase the negative feedback voltage. This causes $h_2$ and $h_1$ to quickly jump from the green area to the yellow area causing the color patch seen by the observer to suddenly turn yellow. Similarly on a further temperature rise, the color will jump quickly from the yellow area to the red area.

Figure 6:
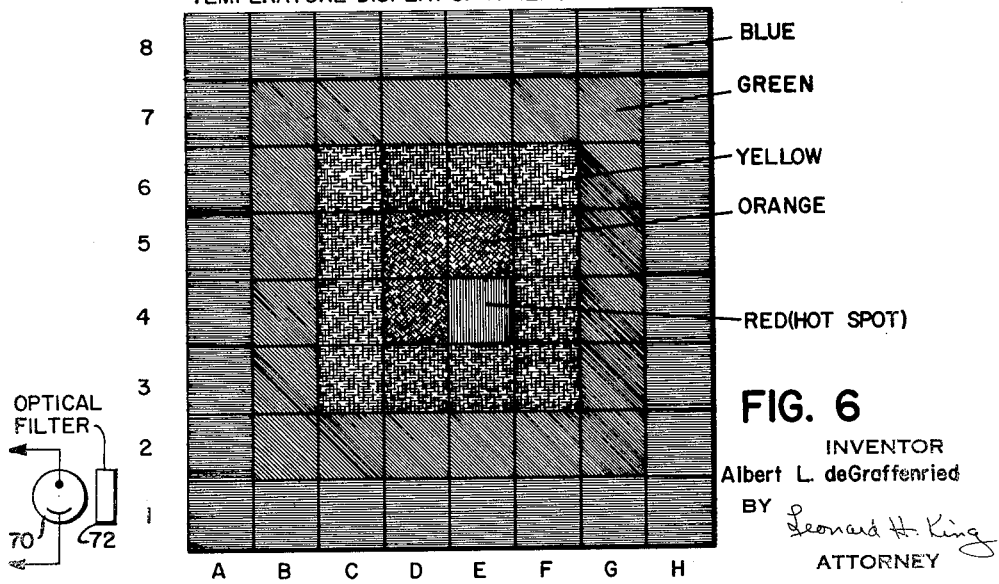
FIG. 6 is a front elevation of another visual display configuration wherein units of the present invention are adapted to monitor a system in terms of isometrics.

It will be appreciated that a very large number of different arrangements will occur to those skilled in the art utilizing single or tandem colums of mercury, solid or multibanded mosaics, and optical fiber bundles, as desired. FIG. 6 indicates a matrix formed of 64 modules arranged in an 8 x 8 square matrix, representing individual components of a similarly arranged reactor. This is a display of temperature as a function of two variables representing the X and Y axes. Isothermal lines are here represented by isochrome lines, and the operator recognizes immediately that he is looking at the temperature topography of the reactor. As illustrated zone 4e is at a dangerous temperature peak and must be moderated by increasing the flow rate of the cooling fluid.

If desired, a single monitor can be provided for the entire display of FIG. 6. By providing a photocell 70 having a narrow-pass optical filter 72, the monitor can be weighted to react to a combination of various conditions. For example, one red element may be made equal to two orange elements or five yellow elements in terms of a given output signal to this photocell, thus providing a proper "skirt contour" to the photocell. All 64 modules of FIG. 6 can thus be monitored by a single photocell.

There has thus been provided, in accordance with the present invention, visual display means adapted to a very wide range of systems where visual monitoring means are desired.

There has been disclosed heretofore the best embodiment of the invention presently contemplated and it is to be understood that various changes and modifications may be made by those skilled in the art without departing from the spirit of the invention.

What is claimed is:

1. An improved external signal magnitude indicator having an electroluminescent element comprising an electroluminescent member and two electrodes for setting up a voltage across the electroluminescent member wherein the electric connection between at least one of the electrodes and at least part of the electroluminescent member is effected through an electroconductive fluid across a variable area, the electroconductive fluid being so confined as to permit its level to be varied to effect a variation of the area in response to changes in the magnitude of the external signal, said improvement comprising:
   (a) a thermo-electric element actuated by a reversible D.C. current, whereby one polarity of D.C. current generates a heating effect in said element and the opposite polarity of the D.C. current generates a cooling effect in said thermolelectric element; and
   (b) a vaporizable fluid in thermal contact with said thermoelectric element, said vaporizable fluid thereby adapted to be contracted to the liquid phase and expanded to the gas phase depending on the polarity of the D.C. current, said vaporizable fluid being in fluid communication with the electroconductive fluid whereby the level of the electroconductive fluid will vary as a function of the D.C. current, the D.C. curent defining the external signal.

2. An improved external signal magnitude indicator having an electroluminescent element comprising an electroluminescent member and two electrodes for setting up a voltage across the electroluminescent member wherein the electric connection between a selected one of the electrodes and at least part of the electroluminescent member is effected through an electroconductive fluid across a variable area, the electroconductive fluid being so confined as to permit its level to be varied to effect a variation of the area in response to changes in the magnitude of the external signal; said improvement comprising a conductive metal layer covering a portion of the upper part of said electroluminescent member whereby when the level of the electroconductive fluid reaches the level of said conductive metal layer additional electric connection is made to said selected electrode through the electroluminescent layer.

3. An improved external signal magnitude indicator having an electroluminescent element comprising an electroluminescent member and two electrodes for setting up a voltage across the electroluminescent member wherein the electric connection between at least one of the electrodes and at least a part of the electroluminescent member is effected through an electroconductive fluid across a variable area, the electroconductive fluid being so confined as to permit its level to be varied to effect a variation of the area, said improvement comprising:
   (a) a chamber positioned proximate to the electroluminescent element;
   (b) an opaque liquid within said chamber, said opaque liquid having a level lower than that of the electroconductive liquid; and
   (c) means to simultaneously vary the levels of the electroconductive liquid and said opaque liquid responsive to the external signal.

4. An improved external signal magnitude indicator having an electroluminescent element comprising an electroluminescent member and two electrodes for setting up a voltage across the electroluminescent member wherein the electric connection between at least one of the electrodes and at least a part of the electroluminescent member is effected through an electroconductive fluid across a variable area, the electroconductive fluid being so confined as to permit its level to be varied to effect a variation of the area in response to changes in the magnitude of the external signal, wherein the electroluminescent member is composed of areas of different electroluminescent phosphor composition, each indicative of a different fluid level, and wherein the electroluminescent member is adapted to provide radiation of a plurality of colors, said improvement comprising: a bundle of optical fibers having an input end and an output end, said fibers being arranged in a random arrangement, the input end of said fibers being in juxtaposition with the electroluminescent member.

5. A map of a field having discrete areas, and means associated therewith for providing a series of signals externally thereof indicative of the magnitude of a given parameter of the discrete area, said map being composed of a plurality of individual devices for indicating the magnitude of the external signal of a given area, each said device having an electroluminescent element comprising an electroluminescent member and two electrodes for setting up a voltage across said electroluminescent member wherein the electric connection between at least one of said electrodes and at least a part of said electroluminescent member is effected through an electroconductive fluid across a variable area, the electroconductive fluid being so confined as to permit its level to be varied to effect a variation of the area in response to changes in the magnitude of the external signal.

6. In combination, the map of claim 5 and a photocell arranged to sense the total electroluminescent output of said map.

7. The device of claim 5 including a color correcting filter in front of said photocell.

References Cited by the Examiner

UNITED STATES PATENTS

| | | | |
|---|---|---|---|
| 1,955,315 | 4/34 | Styer | 340—244 |
| 2,666,116 | 1/54 | Schweingruber. | |
| 3,038,097 | 6/62 | De Graffenried | 313—108.1 |
| 3,082,343 | 3/63 | Duinker et al. | 313—108.1 |

NEIL C. READ, *Primary Examiner.*